Figure 1:
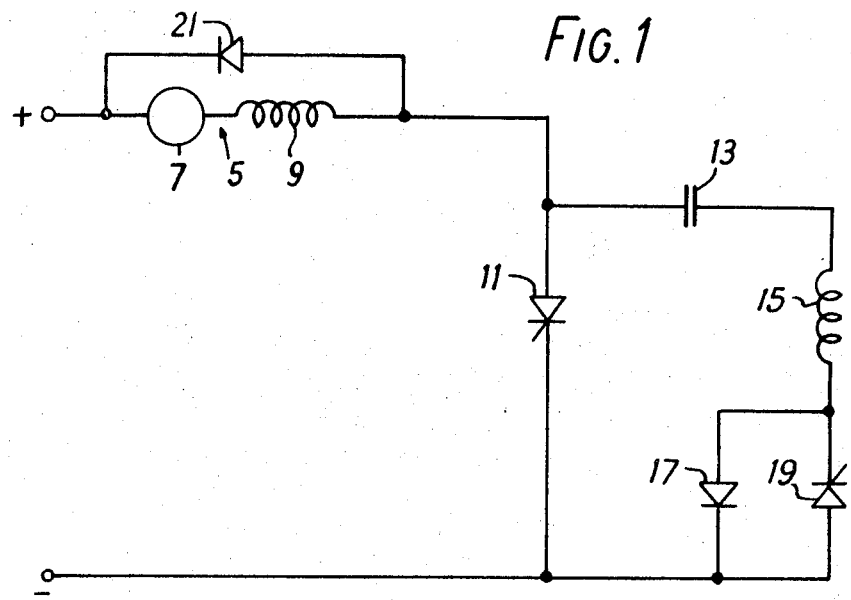
Figure 2:
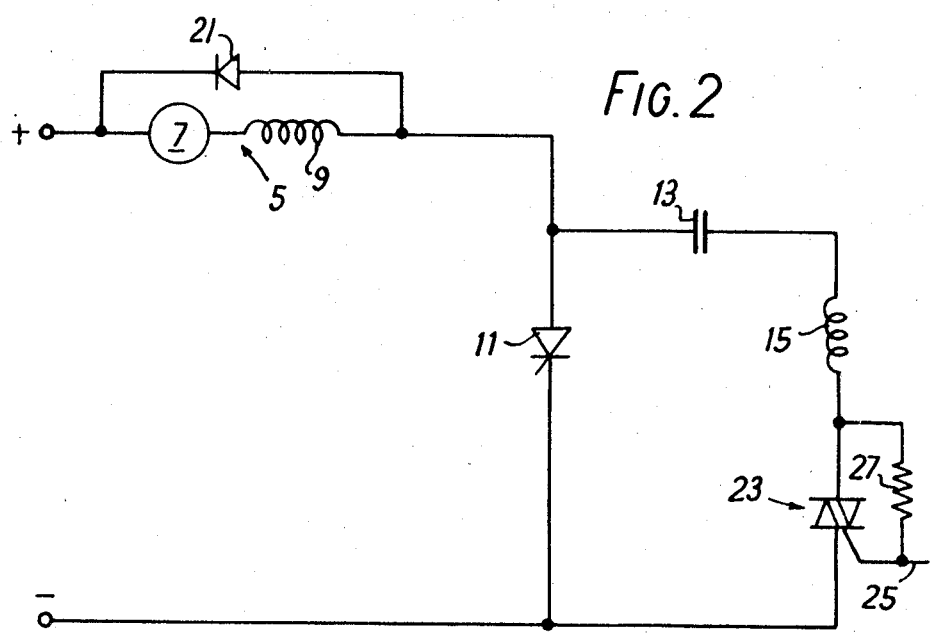

the use of a
United States Patent

Gurwicz

[15] 3,648,151

[45] Mar. 7, 1972

[54] CHOPPER CIRCUIT
[72] Inventor: David Gurwicz, Gateshead, England
[73] Assignee: Sevcon Engineering Limited, Gateshead, Co. Durham, England
[22] Filed: Aug. 7, 1969
[21] Appl. No.: 848,298

[30] Foreign Application Priority Data
  Aug. 8, 1968  Great Britain.......................38,015/68

[52] U.S. Cl. .............................321/43, 321/45 C, 318/345, 323/24
[51] Int. Cl. .................................................H02m 7/44
[58] Field of Search....................318/345, 246; 321/45 C, 43; 323/24, 25

[56] References Cited

UNITED STATES PATENTS 3,242,352  3/1966  Long ............................321/45 C UX

OTHER PUBLICATIONS

Menard et al., IBM Technical Disclosure Bulletin, Vol. 6, No. 8, January 1964, pages 31, 32

Primary Examiner—J. D. Miller
Assistant Examiner—Robert J. Hickey
Attorney—Browdy and Neimark

[57] ABSTRACT

A variable mark-space ratio pulse controller in which a main thyristor for controlling the supply of direct current to a load is commutated by discharge of a capacitor occuring immediately on reversal of the charge thereon so that the use of a separate thyristor which is turned on to pass discharge current from the commutating capacitor to commutate the main thyristor is avoided.

2 Claims, 2 Drawing Figures

Patented March 7, 1972 3,648,151

Inventor
David Gurwicz
by Browdy and Neimark
Attorneys

CHOPPER CIRCUIT

This invention relates to electrical control systems. More particularly, the invention is concerned with electrical control systems for controlling the supply of direct current to an electrical load.

In relation to DC electric motors, for example, it is known to control the mean current supplied in the case of a series motor to the field and armature windings and in the case of a shunt motor to the field windings by means of a variable mark-space ratio pulse controller which operates to vary in a given time the duration of direct current pulses as the case may be, to the field windings and armature or to the field windings of the motor. Such a controller is described, for example, in our British Patent No. 950,734.

In pulse controllers of the kind referred to it is usual practice to provide a main thyristor for connecting the source of power to the load, the main thyristor being shunted by a commutating capacitor in series with a turnoff thyristor which is itself shunted by an inductor and a unidirectional conduction device (usually either a diode or a thyristor). The controller also incorporates oscillators for firing the thyristors in desired timed sequence. The operation is that when the turnoff thyristor is fired, the commutating capacitor is forward charged by the direct current and when the main thyristor fires it causes a power pulse to flow through the load and it also commutates the turnoff thyristor. Moreover, during conduction of the main thyristor the charge on the commutating capacitor is reversed by flow of charge from the capacitor via the main thyristor, the inductor and the unidirectional conduction device. The charge reversal on the commutating capacitor places it in a condition to effect commutation of the main thyristor on refiring of the turnoff thyristor.

It is an object of the present invention to avoid utilizing a turnoff thyristor in a pulse controller of the kind referred to.

The present invention consists in a variable mark-space ratio pulse controller which comprises a main thyristor for controlling the supply of direct current to a load, a commutating capacitor, an inductor in series with the capacitor, a first path in series with the capacitor and inductor and a second path disposed in parallel with the first path, wherein the first and second paths are provided by a triac device the gate of which is connected in said first path to provide uncontrolled unidirectional conduction of current through the gate and semiconductor layers of the triac in a direction opposed to the direction of current flow through the main thyristor, the gate of the triac device further being connected to a supply of triggering pulses which renders the triac conductive in the same direction as that of current flow through the main thyristor, the triac thereby functioning both as a diode in one current direction and as a controlled rectifier in the other current direction.

Suitably, the load is a DC series motor or the field windings of a DC shunt motor.

In operation prior to conduction of the main thyristor the commutating capacitor is charged from the source by way of the load, the inductor and the triac device in the first path. The main thyristor then is fired into conduction so that on subsequently supplying a triggering pulse to the triac device reversal of charge on the commutating capacitor takes place via the main thyristor, the second path and the inductor. When the capacitor is fully reverse charged it then immediately discharges via the inductor and the triac device so commutating the main thyristor and the thyristor in the second path.

It will be appreciated that the commutation current has to be high to oppose the load current and since it flows through the inductor, the inductance of the inductor must be low. This in turn means that the reversal time for charge on the capacitor is low and the reversal current is high. Accordingly, since the commutating current is also high (as it has to oppose the load current) the capacitor must possess a relatively high r.m.s. rating. It is only recently that the requisite capacitors have become commercially available and made practicable the present invention.

The invention will now be described by way of example, with reference to the accompanying drawing, which is a circuit diagram of one embodiment of the invention.

Referring to the drawing, the positive side of a DC power source, which could alternatively be a rectified AC source, is connected via a main contactor, not shown, to a series motor 5, having an armature 7 and field windings 9, which connects with the anode of a main thyristor 11 whose cathode is connected to the negative side of the source. The main thyristor 11 is connected also in parallel with a series branch comprising a commutating capacitor 13, an inductor 15 and a triac device. The triac device provides first and second parallel paths of which the first path functions as a diode permitting current flow in a sense opposite to that of current flow through the main thyristor 11, while the second path of the triac consists of a thyristor which when triggered into conduction affords a conductive path for current which flows in the same sense as current through the main thyristor 11. To this end, the triac has a gate electrode 25 which is connected via a resistor 27 to the end of the inductor 15 remote from the commutating capacitor 13. When the triac is not provided with a firing pulse at its gate and when the common point of the inductor 15 and the triac 23 is at a positive potential with respect to the negative side of the supply electrode 25 is biassed by virtue of the resistor 27 so that the triac acts as a diode permitting current flow in a direction opposite to the flow of current through the thyristor 11 when the latter is in a conducting condition. However, when a firing pulse is supplied to the gate 25 the triac is placed in a conducting state to permit current flow in the same sense as that through the main thyristor 11 during conduction of the latter. A diode 21 is provided which shunts the motor and serves as a so-called "free wheel" diode to maintain current flow in the motor during nonconducting periods of the main thyristor 11.

Oscillator means of known form are provided for firing the main thyristor and the triac device in known controllable manner to provide for variation of the duration or frequency of power pulses through the circuit of the motor 5 and main thyristor 11.

In operation the commutating capacitor 13 charges by way of the source, the motor 5, the inductor 15 and the triac 23 in its uncontrolled conductive direction so that the capacitor plate connected with the main thyristor anode is rendered positive. The main thyristor 11 is then fired into conduction and DC power flows through the motor. A firing pulse is then supplied to the gate electrode of the triac 23 and this enables the charge on the capacitor to reverse by current flow in the path consisting of the main thyristor 11, the triac 23 in its controlled conductive direction, and the inductor 15. As the reversal of charge is completed the capacitor immediately commences to discharge thereby commutating the further and main thyristors.

The period of conduction of the main thyristor is thus determined by the interval between firing of the main thyristor 11 and the triac 23 and also the time taken to reverse charge the commutating capacitor 13 via the inductor 15. Since the commutation current has to be large (at any time equal and opposite to the maximum load current) and since the commutation current flows through the inductor 15, the inductance of the latter must be small. Also as the inductance is low the charge reversal current is high so that the r.m.s. rating of the capacitor has to be high as it is subject to high values of reversal and commutating current. Capacitors possessing the requisite ratings have recently become commercially available.

I claim:

1. A variable mark-space ratio pulse controller which comprises a main thyristor for controlling the supply of direct current to a load, a commutating capacitor, an inductor in series with the capacitor, a first path in series with the capacitor and inductor, and a second path disposed in parallel with the first path, wherein the first and second paths are provided by a triac device, the gate of which is connected in said first path to provide uncontrolled unidirectional conduction of current through the gate and semiconductor layers of the triac in a direction opposed to the direction of current flow through the main thyristor, the gate of the triac device further being connected to a supply of triggering pulses which renders the triac conductive in the same direction as that of current flow through the main thyristor, the triac thereby functioning both as a diode in one current direction and as a controlled rectifier in the other current direction.

2. A controller as claimed in claim 1 disposed in series with a load comprising one of a DC series motor and the field windings of a DC shunt motor.

* * * * *